UNITED STATES PATENT OFFICE.

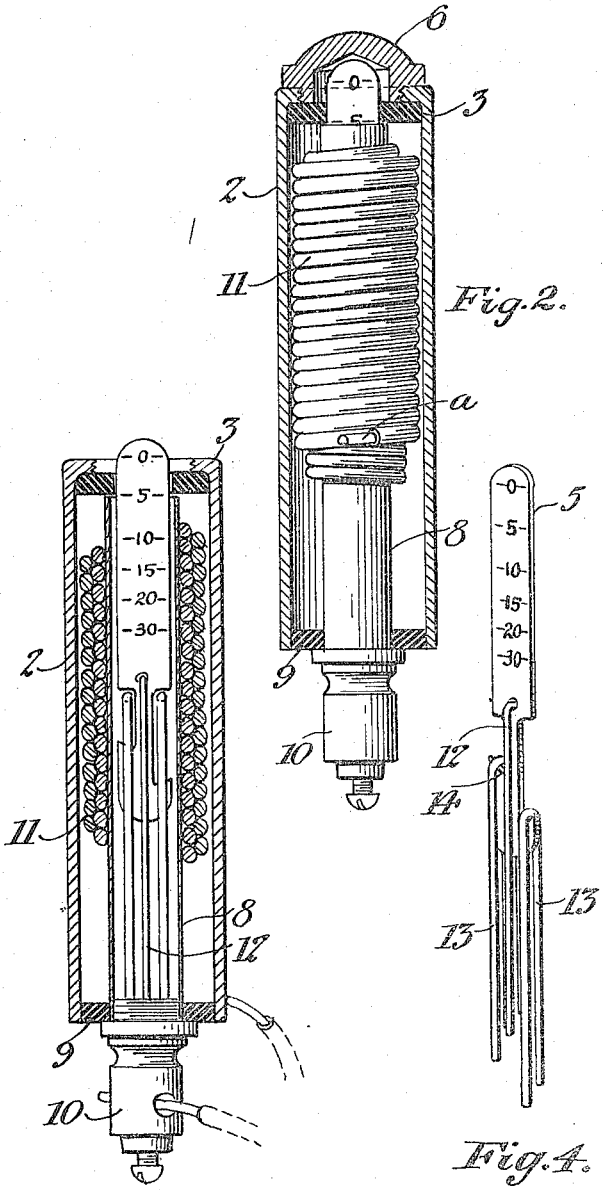

HUBBARD C. WEST, OF MOUNT VERNON, NEW YORK, ASSIGNOR OF ONE-FOURTH TO DAVID M. BENFORD AND ONE-HALF TO SARAH B. BENFORD, BOTH OF MOUNT VERNON, NEW YORK.

ELECTRICAL MEASURING INSTRUMENT.

1,193,095.      Specification of Letters Patent.      Patented Aug. 1, 1916.

Application filed September 4, 1914. Serial No. 860,144.

*To all whom it may concern:*

Be it known that I, HUBBARD C. WEST, a citizen of the United States, residing at Mount Vernon, in the county of Westchester and State of New York, have invented certain new and useful Improvements in Electrical Measuring Instruments, of which the following is a specification.

This invention relates to improvements in electrical measuring instruments, the object of the invention being to provide an improved device of this character for measuring the force of electric currents in degrees corresponding to amperes or other units which is simple in construction, inexpensive and can be made of comparatively small size for measuring currents of considerable force, and in which device a movable graduated scale is used for indicating the force of the current.

A further object of the invention is the provision of an improved device of the character described having a graduated sliding scale for indicating the force of the current and one or more weights for retarding the sliding movement of such scale.

A further object of the invention is the provision of an improved device of the character described comprising a supporting member in the form of a hollow casing having therein a guiding member for guiding a sliding graduated scale.

In the drawings accompanying and forming part of this specification, Figure 1 is a side view of this improved instrument; Fig. 2 is a partly sectional side elevation of the device, showing the parts assembled; Fig. 3 is a sectional elevation showing the scale with its weights in normal position within the guide member; Fig. 4 is a perspective view of the graduated sliding scale and its retarding weights and the magnetic member for causing the operation of the scale; and Fig. 5 is a plan view of the insulating member at the top of the casing, through which the scale projects.

Similar characters of reference indicate corresponding parts in the different figures of the drawing.

This improved instrument comprises in the present instance a supporting member in the form of a hollow shell or casing 2, shown herein as of tubular form, of suitable conducting material and provided near one end thereof with an insulating member or disk 3 having therein a slot 4 for the passage of a graduated sliding scale 5 therethrough. The shell 2 is also provided with a detachable threaded cap 6 for the end through which the scale projects for protecting the end of the scale when not in use and also preventing access of dust and dirt to the interior of the instrument, such cap being provided with a knurled edge 7 to permit it to be easily removed.

Within the shell or casing 2 is arranged a metal guide in the form of a hollow member and shown as a tubular guide 8 of non-magnetic material, but preferably of some suitable conducting material, extending lengthwise of the casing and having secured thereon adjacent to one end an insulating disk 9 the outer edge of which fits snugly within the shell 2 for insulating said tube from such shell, the tube being provided outside of the shell with the usual contact member or binding post 10 for connection with one pole of the battery whose capacity is to be measured. Around the tube 8 is wound an insulated wire coil 11 to form a solenoid, one end or terminal of which coil is in contact with the tube 8 and the other end or terminal, as *a* projects outward so as to contact with the shell 2, the coil being movable along the guide tube 8 for the purposes of adjustment.

Within the tubular guide 8 is arranged a graduated scale 5 of some suitable non-magnetic material, having one end projecting slightly beyond the end of the shell 2 through the insulated slot 4 of the disk 3. In the present instance the scale is shown as a flat strip and is provided with a member 12 loosely connected thereto, this member being formed of any suitable magnetizable material and in the present instance is shown of the inverted U shape passing through a hole in the scale 5 with its ends projecting downward toward the binding post 10, although this member may be of any other suitable form desired.

For the purpose of insuring the accuracy of the reading indicated by the scale, I have provided one or more weights 13, two being shown in the present instance, and these weights are so arranged that when the lines of force are taken up by the member 12, which forms a magnet and thereby causes the scale to move upward, one of these weights is first picked up and on the further upward movement of the scale in response to greater force successive weights are picked up so as to retard the upward movement of the scale, thereby insuring the accuracy thereof. These weights are preferably made of some suitable non-magnetic material, and in the present instance are shown for convenience in assembling also of inverted U shape, the scale 5, which in itself forms a weight, being cut out at its edges, as at 14, to permit these members to overhang the projection thus formed. Of course, it will be understood that the number of these retarding weights might be increased indefinitely according to the size of the instrument, it being deemed sufficient for the present purposes to show but two. It is also to be understood that the form of the weights is immaterial, as weights of any form or shape so arranged as to successively come in contact with the scale so as to retard its upward movement are entirely within the purview of my invention.

The instrument is assembled as shown in Fig. 2. That is to say, the scale with its retarding weights and the member 12 attached thereto is placed within the tubular guide 8 through the open upper end thereof, and this tube with the movable coil 11 wound therearound is then placed within the shell 2 through the open end thereof. The guide tube is then turned until the end of the scale registers with the slot 4 in the insulating disk 3 at the opposite end of the casing 2 and the guide tube pushed forward until the end of the scale projects outside of such slot and the insulating disk 9 closes the opposite end of the shell 2. It will be seen that the members 12 and 13 are at this time resting on the inner end of the contact point or binding post 10, the coil 11 being, as hereinbefore stated, in contact at one end with the guide tube 8 and at the other end with the shell 2. The graduations of the scale are such that when not in use it will show zero in line with the end of the shell, and when current is applied by connecting one pole of a battery to the contact point 10 of the guide tube and the other pole in contact with the shell 2 the scale will project out sufficiently to indicate the capacity of the battery.

It will thus be observed that I have provided an electrical measuring instrument having a sliding graduated scale for indicating the strength of the current which possesses the advantage of extreme simplicity of construction and does away with the use of pivots, springs and all such devices, and not only this, but by the use of a slidable scale in combination with a series of weights of any suitable form in the manner shown the instrument may be made very much shorter, since by merely adding weights, thereby producing a greater resistance to the current, the graduations on the scale may be placed closer together so as to render an instrument of comparatively small size capable of measuring strong currents. Moreover it will be observed that in the present instance the scale is the movable member, thus doing away with the use of a movable pointer and thereby simplifying the device.

The present improvement makes possible the use of a sliding scale which in the form shown may project beyond the casing, so that a comparatively short length of instrument is obtainable, because, no liquid being used, the casing does not have to be liquid tight and therefore, as there is no danger of the overflowing of a liquid from the casing the scale may, as stated, project beyond such casing and this without any appreciable frictional engagement with the slotted walls, which would of course be present where a packing is used to keep the liquid in the casing, and which of course would interfere materially with the proper working of the instrument. Moreover, the present improvement does entirely away with the use of glass and because of the way it is constructed the instrument is not only simplified, as hereinbefore stated, and rendered less expensive to manufacture, but it can be thrown into a tool box or even dropped upon the floor without any of the parts breaking. In other words, the present improvement is so constructed that it does not have to be delicately handled, as are all devices of this character where liquid or glass is used either as a dial or for the reception of the liquid. In short, the present improvement is practically indestructible, in the sense that there is no glass forming a part thereof and no liquid is used to interfere with the instrument being laid on its side or tipped upside down, and consequently the scale is a non-floating one.

I claim as my invention:

1. An electrical measuring instrument comprising a supporting member, guiding means carried thereby, a movable graduated scale located in said guiding means and adapted to be projected beyond the same, and means including a magnetic core for effecting the movement of said scale on the application of energy to the instrument, said scale acted upon by gravity only in one direction and by the magnetic core only in the opposite direction.

2. An electrical measuring instrument comprising a supporting member, guiding means carried thereby, a nonmagnetic movable graduated scale located in said guiding means and adapted to be projected beyond the same, and means including a magnetic core for effecting the movement of said scale on the application of energy to the instrument, said scale acted upon by gravity only in one direction and by the magnetic core only in the opposite direction, whereby the use of a floating or liquid supported or glass inclosed instrument is avoided.

3. An electrical measuring instrument comprising a supporting member, guiding means carried thereby, a sliding graduated scale located in said guiding means and adapted to be projected beyond the same, and means including a magnetic core for effecting the movement of said scale on the application of energy to the instrument, said scale acted upon by gravity only in one direction and by the magnetic core only in the opposite direction.

4. An electrical measuring instrument comprising a supporting member, guiding means carried thereby, a movable graduated scale located in said guiding means and adapted to be projected beyond the same, means including a magnetic core for effecting the movement of said scale on the application of energy to the instrument, and one or more weights coöperating with said scale to retard the movement thereof, said scale acted upon by gravity only in one direction and by the magnetic core only in the opposite direction.

5. An electrical measuring instrument comprising a supporting member, guiding means carried thereby, a non-magnetic movable graduated scale carried by said guiding means and adapted to be projected beyond the same, a solenoid magnetizable means adapted to be energized thereby and connected with said scale, said scale acted upon by gravity only in one direction and by the magnetizable means only in the opposite direction.

6. An electrical measuring instrument comprising a hollow solenoid, a sliding graduated member comprising a scale within said solenoid and adapted to be projected beyond the same on the application of energy to the solenoid, and means for retarding the movement of said member, said member acted upon by gravity only in one direction and by the solenoid only in the opposite direction.

7. An electrical measuring instrument comprising a hollow solenoid, a sliding graduated member comprising a scale within said solenoid and adapted to be projected beyond the same on the application of energy to the solenoid, and means for retarding the movement of said member and comprising a plurality of weights successively effective, said member acted upon by gravity only in one direction and by the solenoid only in the opposite direction.

8. An electrical measuring instrument comprising an outer casing, a central hollow guiding member of conducting non-magnetic material, a magnetic coil carried thereby, a movable scale in said hollow member, and one or more weights and a magnetic member carried by said scale and free to move in said hollow member under the influence of lines of force set up by said coil, said scale acted upon by gravity only in one direction and by the magnetic coil only in the opposite direction.

9. An electric measuring instrument comprising a casing, a hollow coil-wound member within said casing, a sliding graduated scale within said member, and a plurality of weights adapted to be successively effective on the sliding movement of the scale.

10. An electrical measuring instrument comprising a casing, a hollow coil-wound member within said casing, a sliding graduated scale within said member, and a plurality of U-shaped weights adapted to be successively effective on the sliding movement of the scale.

11. An electrical measuring instrument comprising a tubular casing, a hollow coil-wound tube therein, a sliding scale within said tube, and a plurality of weights adapted to be successively effective on the sliding movement of the scale.

12. An electrical measuring instrument comprising a casing, a hollow coil-wound member within said casing, a sliding graduated scale within said member, and a plurality of means adapted to be successively effective on the sliding movement of the scale.

13. An electrical measuring instrument comprising a hollow member, a coil wound on said member and having one terminal in contact therewith, a shell inclosing said member and coil and with which the other terminal of the coil is in contact, a graduated scale adapted to slide within said member, and means for retarding the sliding movement of said scale.

14. An electrical measuring instrument comprising a coil, a tubular member in contact with said coil, a shell in contact with said coil and insulated from said member, a graduated scale adapted to slide within said member and to project beyond the end of said shell, and means for retarding the sliding movement of said scale.

15. An electrical measuring instrument comprising a coil, a tubular member in electrical contact with said coil, a shell in electrical contact with said coil and insulated from said tubular member, a graduated scale adapted to slide within said member and to project beyond the end of said shell, and gravity actuated means for retarding the sliding movement of said scale.

16. An electrical measuring instrument comprising a coil, a tubular member in contact with said coil, a shell in contact with said coil and insulated from said member, a graduated scale adapted to slide within said member and to project beyond the end of said shell, and a plurality of weights for retarding the sliding movement of said scale.

17. An electrical measuring instrument comprising a tubular member, a graduated non-magnetic scale adapted to slide within said member, a movable coil wound on said member and having one terminal in contact therewith, a shell inclosing said coil and in contact with the other terminal thereof and insulated from said member, and means within said member for retarding the sliding movement of said scale.

18. An electrical measuring instrument comprising a tubular member, a graduated non-magnetic scale adapted to slide within said member, a movable coil wound on said member and having one terminal in contact therewith, a shell inclosing said coil and in contact with the other terminal thereof and insulated from said member, and non-magnetic means within said member for retarding the sliding movement of said scale.

19. An electrical measuring instrument comprising a tubular member having a contact part for engagement with a source of electricity, a graduated scale adapted to slide within said tubular member, a shell surrounding said member and insulated therefrom, a coil between said member and shell and in contact with both, and means for retarding the sliding movement of said scale.

20. An electrical measuring instrument comprising a tubular member having a contact part for engagement with a source of electricity, a graduated scale adapted to slide within said tubular member, a shell surrounding said member and insulated therefrom, a coil between said member and shell and in contact with both, and gravity actuated means for retarding the sliding movement of said scale.

21. An electrical measuring instrument comprising a tubular member having a contact part for engagement with a source of electricity, a graduated scale adapted to slide within said tubular member, a shell surrounding said member and insulated therefrom, a coil between said member and shell and in contact with both, and non-magnetic gravity actuated means for retarding the sliding movement of said scale.

22. An electrical measuring instrument comprising a tubular member having a binding post, a graduated scale adapted to slide within said member, a shell surrounding said member and insulated therefrom, a coil between said member and shell and in contact with both, and non-magnetic means adapted to engage said scale for retarding the sliding movement thereof.

23. An electrical measuring instrument comprising a tubular member having a binding post, a graduated scale adapted to slide within said member, a shell surrounding said member and insulated therefrom, a coil between said member and shell and in contact with both, and a plurality of weights adapted to successively engage said scale for retarding the sliding movement thereof.

24. An electrical measuring instrument comprising a tubular member having a binding post, a graduated scale adapted to slide within said member, a shell surrounding said member and insulated therefrom, a coil between said member and shell and in contact with both, and a plurality of weights carried within said member and adapted to successively engage said scale for retarding the sliding movement thereof.

25. An electrical measuring instrument comprising a tubular member having a binding post, a graduated scale adapted to slide within said member, a shell surrounding said member and provided with an insulating disk at one end thereof having a slot for the projection of said scale, an insulating disk carried by said member and adapted to close the opposite end of said shell, a coil between said member and shell and in contact with both, and non-magnetic means within said member for retarding the sliding movement of said scale.

26. An electrical measuring instrument comprising a tubular member having a binding post, a graduated scale adapted to slide within said member, a shell surrounding said member and provided with an insulating disk at one end thereof having a slot for the projection of said scale, an insulating disk carried by said member and adapted to close the opposite end of said shell, an electric coil between said member and shell and in contact with both, and a plurality of non-magnetic weights within said member adapted to successively engage said scale for retarding the sliding movement thereof.

27. An electrical measuring instrument comprising a tubular member having a binding post, a graduated scale adapted to slide within said member, a shell surrounding said member and provided at one end thereof with an insulating disk having a slot for the projection of said scale and a protecting cap for said end, an insulating disk carried by said member and adapted to close the opposite end of said shell, a coil between said member and shell and in contact with both, and a plurality of weights within said member adapted to successively engage said scale for retarding the sliding movement thereof.

Signed at New York, in the county and State of New York, this 24th day of August, 1914.

HUBBARD C. WEST.

Witnesses:
F. E. BOYCE,
W L. BAKELAR.

Copies of this patent may be obtained for five cents each, by addressing the "Commissioner of Patents, Washington, D. C."